Aug. 25, 1959 R. SERRELL 2,901,549

MAGNETIC RECORDING SYSTEM

Filed May 29, 1953

INVENTOR.
Robert Serrell
BY Morris Rabkin
ATTORNEY 2,901,549

MAGNETIC RECORDING SYSTEM

Robert Serrell, Princeton, N.J., assignor to Radio Corporation of America, a corporation of Delaware Application May 29, 1953, Serial No. 358,398
7 Claims. (Cl. 179—100.2)

This invention relates to magnetic record transducing means, and more particularly to transducing means wherein the output of the transducer is responsive to the instantaneous amplitude of an external magnetic signal but is substantially independent of the rate of change in the external field.

There have been proposed, in the past, a great number of transducing means for translating various signals into magnetic signals stored on a magnetizable record member. Similarly, systems have been proposed for translating those magnetically stored signals back into substantially their original form. Most of these systems have been frequency sensitive. That is, the output of the transducer varies with the frequency of the signal, or with the time rate of change of the signal.

It is an object of the present invention to provide an improved transducing means for magnetic records which is substantially independent of the time rate of change of the signals.

It is another object of this invention to provide a transducing means as set forth characterized in that the transducer is periodically keyed.

It is a further object of this invention to provide a system for transducing magnetic record signals as a series of discrete pulses.

Still another object of this invention is to provide a novel magnetic record transducing means capable of accommodating high frequency signals on the order of frequency of signals required in television image recording.

In accomplising these and other objects, there has been provided, in accordance with the present invention, a magnetic record transducing head having a core structure comprising a first and second loop. The first loop is a closed loop and the second loop includes the first loop and has a signal translating gap located opposite the first loop. Means are provided for selectively and periodically saturating the first loop. The second loop carries signal windings. The second loop is normally balanced and no signal is transduced by operation of the saturating means. However, when the second loop is unbalanced, the operations of the saturating means causes a signal to be transduced.

Figure 1:
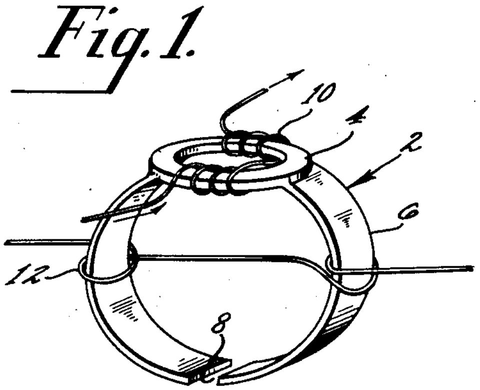

A better understanding of this invention may be had from the following detailed description when read in connection with the accompanying drawings, in which, Fig. 1 is a perspective view, partly schematic, of a transducer head constructed in accordance with the present invention.

Figures 2, 3:
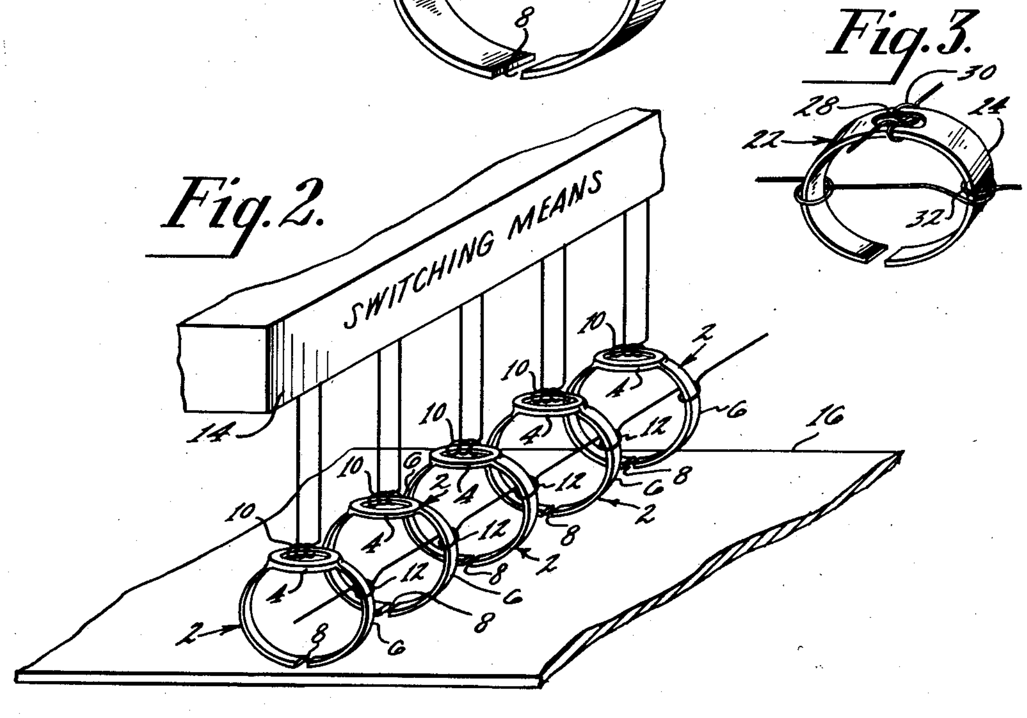
Figure 4:
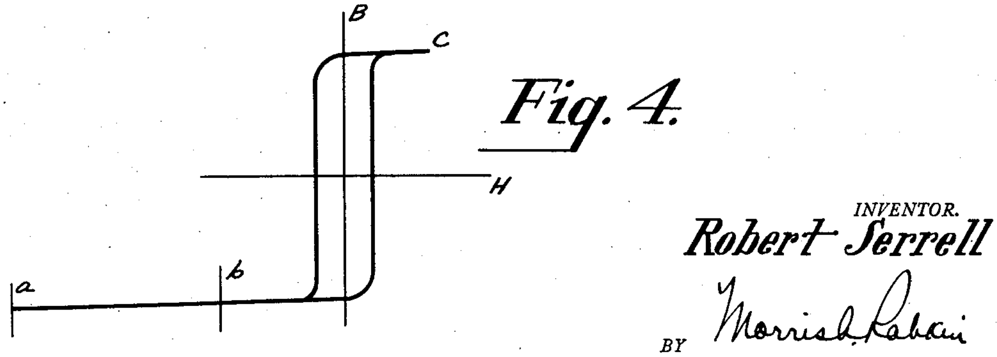

Fig. 2 is a perspective, schematic view of a transducing system made in accordance with the present invention, and Fig. 3 is a perspective view of another form of transducer made in accordance with the present invention, and Fig. 4 is a characteristic curve of a preferred magnetic material suitable for use in the core structures of apparatus made in accordance with the present invention.

Referring now to the drawings in more detail, there is shown in Fig. 1 a transducer 2 which includes a core of magnetizable material. The core structure comprises a first loop 4 which constitutes a closed magnetic path. A second loop 6 includes a structure of the first loop and has a signal translating gap 8 located opposite from the first loop. An energizing winding or coil 10 is cooperatively associated with the first or closed loop. A second or signal translating winding 12 is cooperatively associated with the second loop. The first and second loops are arranged to lie in mutually perpendicular planes. The energizing winding 10 associated with the first loop is divided into two substantially equal parts with one part of the coil on each of the two sides of the loop. Similarly the signal translating winding 12 is divided into two parts with one part on each of the two sides of the second loop. The arrangement thus provided establishes, in the absence of external fields, a state of electrical and magnetic balance in the core structure. In other words, if current is made to flow through the energizing winding 10 associated with the first loop 4, the flux will follow a circular path defined by the closed loop. The core structure being balanced, no flux will pass from the first loop 4 in to the second loop 6. However, if an external field is applied to destroy or upset the balance of the system, then a portion of the flux which circulates in the closed loop 4 will flow into the second or open loop 6.

It is contemplated that in utilizing the core structure thus described, a unidirectional source of energy will be applied to the energizing coil 10 of sufficient intensity to cause the closed loop 4 to be magnetically saturated. When the closed loop 4 is thus saturated, a high reluctance is presented to any magnetic field which may be applied to the second loop 6. However, if a pulse of energizing current of a polarity opposite to the initial saturating current is applied to the energizing coil 10, and the pulse has sufficient amplitude to drive the first loop 4 substantially to magnetic saturation with an opposite polarity, any magnetic field presented to the second loop will find a lower reluctance path during the period when the first loop is in a desaturated condition between the two states of saturation. When such an operation is carried out, the external magnetic field will cause flux to flow through the second loop with an intensity which is a function of the intensity of the external field. If, for example, the external field were applied across the translating gap 8 in a form of a minute magnetized area on a magnetic record then, during the transition period of the first loop, the flux flowing in the second loop will induce a current into the signal translating winding 12. Conversely, if the external field were applied to the second loop as a result of current flowing through the signal translating winding 12 then, during the transition period of the first loop, a magnetic field will be caused to appear across the gap 8 tending to magnetize a minute area of a magnetic tape placed in juxtaposition thereto.

It may be seen that a transducer operated in the foregoing manner is substantially independent of the frequency of applied signals, and that the signal translated by the head will be a function of the degree of unbalance established in the second loop by the external signal field. Thus, to adapt a magnetic recording system to accommodate high frequency signals, a triggering means may be connected to the energizing winding 10 associated with the first loop of the transducer 2. The keying means, when not actuated, allows a biasing potential to maintain the closed loop 4 in a state of magnetic saturation of a first given polarity. Whenever a keying pulse is applied, the core material in the first loop passes from the first state of saturation to a second state of saturation with reversed polarity, then returns to its original state. Any of a number of well known keying circuits are suitable for so actuating the herein described transducer. It may readily be appreciated that if keying pulses are applied at say, for example, one megacycle rate, then, if the head is being used as a reproducing head to detect signals magnetically recorded on a tape record member, the output signal current induced into the winding 12 will be a series of microsecond pulses the envelope of which is representative of the signal recorded on the tape. If the material from which the core is made has suitable well known magnetic characteristics including having a rectangular hysteresis loop substantially as represented in Fig. 4, then the core may be keyed in approximately two-tenths of a microsecond. From such an arrangement it should be apparent that a transducing system substantially as set forth herein may readily accommodate frequency corresponding to those conventionally used in television picture transmission.

In Fig. 2 there is shown an arrangement whereby a plurality of transducers substantially similar to that shown in Fig. 1 may be used in a system which may be called time division multiplex. For purposes of simplicity and maintaining clarity of the drawing, the energizing coils for the closed loop 4 of each transducer is shown as comprising a single, undivided winding. Similarly, the signal translating winding 12 is represented as having a single turn around one leg of each of the transducers, the single conductor being a common to all of the transducers connecting the windings serially.

In the system shown in Fig. 2 the energizing coils 10 are connected to a switching means 14. The switching means may comprise any suitable circuitry. One type of selecting system suitable for inclusion in the switching means 14 is shown and claimed in copending application filed in the name of the present inventor on November 30, 1950, bearing Serial No. 198,338, and entitled "Combinatorial Information Storage Network." Although but five transducers 2 are pictorially represented in Fig. 2 it should be understood that the drawing is merely illustrative and that many more or fewer transducers may be used without departing from the spirit and scope of the present invention.

The switching means includes means for biasing the cores 4 in the saturated condition such as represented at point *a* on the curve of Fig. 4. If a switching matrix, substantially as shown and described in the aforementioned copending application, is used, a steady state bias is applied to the core loops 4 which is of sufficient intensity to drive the core well into the saturated region as represented by the point *a* on the B–H curve of Fig. 4. When the switching matrix is in operation, the maximum current applied to any one of the cores other than a particularly selected core, is only half of the current required to drive the core to saturation of an opposite polarity. Such half way point is represented by the point *b* on the curve of Fig. 4. The selected transducer will, of course, receive full current during the instant of selection and will be driven, through a desaturated state, to saturation in the opposite direction as represented by point *c* on the curve of Fig. 4. The output of the switching means to the respective energizing coils 10 is in the nature of a series of sharp pulses of current. As soon as one of the pulses has passed, the core 4 returns from its state of saturation as represented by the point *c* on the curve to its steady state as represented by the point *a* on the curve of Fig. 4. With a suitable switching means, such as the one set forth in the aforesaid copending application, the separate cores may be pulsed in sequence. As they are thus pulsed in sequence, it should be apparent that the series of transducer cores 2 arranged substantially as represented in Fig. 2 will effectively scan transversely across a record tape member 16. Since only one of the plurality of transducers is desaturated at any one instant, the output signal translating windings 12 may be serially connected.

Assuming for the moment that the signal translating winding 12 is connected to a source of signals to be recorded and is cooperatively associated with a series of transducers 2 as shown in Fig. 2, then the sequential pulsing of the individual transducer heads will effect a time division multiplex of the signal applied to the signal translating winding. The signal will be recorded on the tape as a series of discrete magnetic pulses whose intensity is a function of the instantaneous amplitude of the signal at the time the transducer member which records the signal was desaturated or keyed. On playback the operation of the switching means 16 keys the heads 2 whereby they may detect the presence and amplitude of a magnetic signal appearing in juxtaposition to the signal translating gap 8 in any particular head 2 at the moment that it is keyed. Since only one head will be keyed at a time and the series of heads will be keyed in proper sequence, the series connection of the signal translating winding effects a recombining of the signals into a single continuous train of pulses representative of the original signal recorded on tape member 16.

In Fig. 3 there is shown a simplified means of constructing a transducer 22 which is substantially equivalent to the device shown in Fig. 1. The core material of Fig. 3 is a flat ribbon 24 of material having a suitable magnetic characteristic. Instead of being formed with a separate loop as shown in Fig. 1, the closed loop is formed by making a slot or hole 28 through the thickness of the ribbon. Such a hole may be made, for example, by punching or by a saw cut. The energizing coil 30 may then be wound on in a manner substantially the same as that represented in Fig. 1, as may also the signal translating winding 32.

Thus it may be seen that there has been provided an improved magnetic record transducing means which is characterized in that it is substantially independent of frequency, is suitable for operating at frequencies corresponding to television image frequency and which is periodically keyed to effect translation of applied signals.

What is claimed is:

1. Magnetic signal transducing apparatus for cooperation with a magnetic record comprising a magnetic head cooperable with said record having a core structure defining a path for magnetic signals derived from said record, means for magnetically saturating at least part of said path to a given polarity of magnetic saturation, said core structure in at least said part of said path having a substantially rectangular hystereis loop, and means for magnetically pulsing said head to saturation of opposite polarity whereby to render said head operative for transducing signals only upon pulsing thereof.

2. Magnetic signal transducing apparatus for cooperation with a magnetic record comprising a plurality of magnetic heads, each of said heads having a core structure defining a path for magnetic signals recorded on said record, means for magnetically saturating at least part of said paths in each of said core structures to a given polarity of magnetic saturation, and means for magnetically, momentarily de-saturating said heads sequentially for rendering different ones of said heads operative for transducing signals only during said moment when said head is saturated.

3. A record transducing means comprising, in combination, a magnetic record transducing head including a core structure of magnetic material having a first and second loop, said first loop constituting a closed magnetic path, said second loop including said first loop and having a signal translating gap located opposite said first loop, said magnetic material of at least said first loop having a substantially rectangular hysteresis loop, an energizing coil cooperatively associated with said first loop, a signal translating winding cooperatively associated with said second loop, said head being normally electrically and magnetically balanced, means associated with said energizing coil for normally biasing said first loop to magnetic saturation of a given polarity, said last mentioned means including means for periodically pulsing said energizing coil whereby to drive said first loop to magnetic saturation of opposite polarity, and signal means for selectively unbalancing said second loop whereby said head translates signals from said signal means as a function of the amount by which said second loop is unbalanced.

4. A magnetic record transducing means comprising, in combination, a magnetic record transducing head including a core structure of magnetic material having a first and second loop, said magnetic material of at least said first loop having a substantially rectangular hystereis loop, said first loop constituting a closed magnetic path, said second loop including said first loop and having a signal translating gap located opposite said first loop an energizing coil cooperatively associated with said first loop, a signal translating winding cooperatively associated with said second loop, means associated with said energizing coil for biasing said first loop to magnetic saturation of a given polarity, said last mentioned means including keying means periodically and momentarily to desaturating said first loop, and signal means for selectively unbalancing said head during said desaturated periods.

5. A magnetic record transducing means comprising, in combination, a plurality of magnetic record transducing heads, each of said heads having a core structure including a first and second loop, said first loop constituting a closed magnetic path, said second loop including said first loop and having a signal translating gap oppositely located with respect to said first loop, each of said heads having an energizing coil cooperatively associated with the second loop of said heads, means associated with said energizing coils for biasing all of said first loops to magnetic saturation of a given polarity, said last mentioned means including means periodically and momentarily to desaturate said heads singly and sequentially, and signal means for selectively unbalancing said heads during said desaturated periods.

6. Magnetic signal transducing apparatus for cooperation with a magnetic record comprising a plurality of cores of magnetic material, each of said cores having a first loop portion and a second loop portion including said first loop portion, said second loop portion of said cores being adapted to cooperate with said magnetic record, different energizing coils threading each of said first loop portions, keying means coupled to said energizing coils for normally biasing said first loop portions to one polarity of magnetic saturation, said keying means including means for switching different ones of said first portions from said one polarity of magnetic saturation, through a de-saturated state, and to the opposite polarity of magnetic saturation whereby each of said cores is operative for transducing signals only during said de-saturated state thereof, and a single signal translating coil threaded through all of said second loop portions for continually carrying the signal recorded on said record.

7. Magnetic signal transducing apparatus for cooperation with a magnetic tape record comprising a plurality of cores of magnetic material, each of said cores having a first loop portion and second loop portion including said first loop portion, said second loop portion of said cores being spaced from each other in a direction transverse of said tape, different energizing coils threading each of said first loop portions, keying means coupled to said energizing coils for normally biasing said first loop portions to one polarity of magnetic saturation, and said keying means including means for successively switching said first portions of said cores from said one polarity of magnetic saturation, through a de-saturated state and to the opposite polarity of magnetic saturation whereby each of said cores are successively operative for transducing signals only during said de-saturated state thereof so as to scan said tape transversely, and a single translating coil threaded through all of said second loop portions for continually carrying the signal transversely recorded on said tape record.

References Cited in the file of this patent

UNITED STATES PATENTS

| | | |
|---|---|---|
| 2,517,808 | Sziklai | Aug. 8, 1950 |
| 2,608,621 | Peterson | Aug. 26, 1952 |
| 2,700,703 | Nordyke | Jan. 25, 1955 |
| 2,722,569 | Loper | Nov. 1, 1955 |
| 2,804,506 | Schurch et al. | Aug. 27, 1957 |
| 2,830,130 | Greenwood | Apr. 8, 1958 |